(12) United States Patent
Jin

(10) Patent No.: US 7,375,905 B2
(45) Date of Patent: May 20, 2008

(54) OPTICAL UNIT AND IMAGE PICKUP APPARATUS HAVING THE SAME

(75) Inventor: Makoto Jin, Sakai (JP)

(73) Assignee: Konica Minolta Photo Imaging, Inc., Tokyo (JP)

(*) Notice: Subject to any disclaimer, the term of this patent is extended or adjusted under 35 U.S.C. 154(b) by 0 days.

(21) Appl. No.: 11/439,339

(22) Filed: May 23, 2006

(65) Prior Publication Data

US 2006/0268431 A1 Nov. 30, 2006

(30) Foreign Application Priority Data

May 27, 2005 (JP) ............................. 2005-155150

(51) Int. Cl.
G02B 17/00 (2006.01)
G02B 15/14 (2006.01)
H04N 5/228 (2006.01)

(52) U.S. Cl. .................. 359/726; 359/685; 348/208.11

(58) Field of Classification Search ................ 359/726, 359/697, 676–678, 683, 685; 348/208.8, 348/208.11
See application file for complete search history.

(56) References Cited

U.S. PATENT DOCUMENTS 5,182,671 A * 1/1993 Kitagishi et al. ........... 359/675
5,315,435 A * 5/1994 Horiuchi ..................... 359/676
5,661,597 A * 8/1997 Sugawara ................... 359/676
6,414,800 B1 7/2002 Hamano ..................... 359/687
2004/0141065 A1 7/2004 Hara et al. ............. 348/208.11

FOREIGN PATENT DOCUMENTS

JP 06-230317 A 8/1994

* cited by examiner

Primary Examiner—Alicia M Harrington
(74) Attorney, Agent, or Firm—Sidley Austin LLP

(57) ABSTRACT

An optical unit for forming an object image according to the present invention includes: a reflection member for bending an optical axis of the optical unit; a front lens group arranged closer to an object side of the optical unit than the reflection member; a rear lens group arranged closer to an image forming side of the optical unit than the reflection member; and a driver for driving the optical unit. The driver drives the reflection member and the front lens group in a predefined first direction and in a predefined second direction.

19 Claims, 13 Drawing Sheets

OPTICAL UNIT AND IMAGE PICKUP APPARATUS HAVING THE SAME

The application is based on Japanese Patent Application No. 2005-155150 filed on May 27, 2005, in Japanese Patent Office, the entire content of which is hereby incorporated by reference.

FIELD OF THE INVENTION

The present invention relates to an optical unit and an image pickup apparatus having the same.

BACKGROUND OF THE INVENTION

In recent years, apparatuses such as digital still cameras, digital movie cameras and cellular phones utilizing a solid state image pickup element have been widely used. With regard to these apparatuses, in order to minimize the size of the apparatus, the demand for increasing the number of pixels of the solid state image pickup elements such as a CCD Sensor and a CMOS sensor, and for minimizing the size of an optical system has been increased. Consequently, as the number of pixels of the solid state image pickup element increase and the optical system is minimized, the size of the pixel in the solid state image pickup element has been minimized and the light amount entering into each pixel has been decreased. As a result, camera shaking easily occurs.

Further, from the viewpoint of portability and convenience of the these image pickup apparatuses, the demand for making the main body of the apparatus thin and/or the demand of that a lens does not come out from the main body when conducting zooming operation have been increased. In response to these demands, a bending optical axis optical system in which a reflecting member is provided has been proposed.

With regard to the problems of camera shaking, as a device for eliminating the caused shaking, proposed has been a device for correcting caused shaking by providing a detection sensor for detecting the shaking and driving the shaking correction member to cancel the shaking.

An angular velocity sensor is used as the shaking correction sensor. For example, there is known an optical system in which shaking correction is conducted by moving a part of lens components in the optical system in the surface perpendicular to the optical axis of the optical system.

Further, there is proposed an optical system in which a variable vertex angle prism is arranged therein to correct shaking by varying the vertex angle of the prism.

There is proposed an optical system in which shaking is corrected by changing the angle of a reflecting member such as a mirror arranged in the optical system.

FIG. 14 illustrates a shaking correction optical unit 1 based on a conventional technology. In FIG. 14, a symbol 2 denotes a first lens group; a symbol 3 denotes a prism placed on a reference position; a symbol 4 denotes a second lens group, a symbol 5 denotes a third lens group; a symbol 6 denotes a fourth lens group; a symbol 7 denotes a low-pass filter; and a symbol 8 denotes an image pickup element. A symbol 12 denotes the optical axis of the first lens group; a symbol 11 denotes the optical axis of the second lens groups 4, the third lens group 5, and the fourth lens group 6; an optical axis 11 and optical axis 12 cross with the reflection surface of the prism 3 at a point A. A symbol 3a denotes a position of a prism, which is driven an angle of "a" from a reference position centering on the point A to correct the shaking. A symbol 13 denotes an extended line of optical axis 11, which is inflected by the prism rotated to the position 3a and an angle formed by the optical axis 12 and an extended line 13 is equal to 2 a being two times of the angle "a", which is a rotated angle of the prism.

The first lens group 2, the prism 3, the second lens group 4, the third lens group 5, the fourth lens group 6 and the low-pass filter 7 configure the optical unit 1. The second lens group 4 and the third lens group 5 are a variable magnification optical system, and the second lens group 4 and the third lens group 5 moves in the directions indicated by symbols 9 and 10 on the optical axis 11 to smoothly conduct a zooming operation.

In FIG. 14, when the prism 3 stays at the reference position, a light flux travels on the optical axis 12 of the first lens group 2 and the prism 3 at the reference position makes total reflection for the light flux. The reflected light flux is arranged to travel on the optical axis 11. However, when the prism rotates angle by "a" and stays at the position 3a, the light flux 13, which are shifted by angle "2 a" from the optical axis 12 are reflected by the prism 3 positioned at 3a and travel on the optical axis 11.

With regard to the shaking correction methods other than the methods described above, a method for shifting the image pickup element to the direction to cancel the shaking has been proposed.

However, according to the method of moving a part of the optical system, it is necessary to provide space in which the lens moves and space for placing a mechanism for shifting the lens, which is not suitable for minimizing the body of the apparatus. Further, there is a problem that making the apparatus thin cannot be achieved because of the space, even when utilizing an inflecting optical system to make the apparatus thin. Further, according to this method, if the center of the correction lens shifts and coma aberration is generated, there is another problem that focusing performance of the optical system comes down.

According to the method of changing a vertex angle of a prism, it is necessary to arrange the variable vertex angle prism in the optical path of a photographic lens. Accordingly, there is a problem that the optical system cannot be minimized.

According to the method of changing an angle of an reflection member, when conducting shaking correction by changing the angle of the reflection member, as described when explaining the FIG. 14, optical axes in the front and back sides of the reflection member shift and the light flux originally supposed to travel on the optical axis travel off-axis portion, which results in the deterioration of aberration characteristic.

According to the method for shifting the image pickup element, since it is necessary to maximize the image circle of the photographic lens, there is a problem that the size of the photographic lens becomes large.

SUMMARY OF THE INVENTION

An object of the present invention is to provide an optical system having a shaking correction function of high quality image without necessity to have large image circle and optical degradation while maintaining the characteristic that it is possible to minimize the size of an apparatus, which is a merit of an inflection optical system.

In accordance with one of the aspect of the present invention, there is provided an optical unit for forming an object image, having a reflection member for bending an optical axis of the optical unit; a front lens group arranged closer to an object side of the optical unit than the reflection member; a rear lens group arranged closer to an image forming side of the optical unit than the reflection member; and a driver, in which the driver drives the reflection member and the front lens group in a predefined first direction and in a predefined second direction.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE INVENTION

Preferable embodiments of the present invention will be described below.

THE FIRST EMBODIMENT

The first embodiment of the present invention will be described below.

Figure 1:
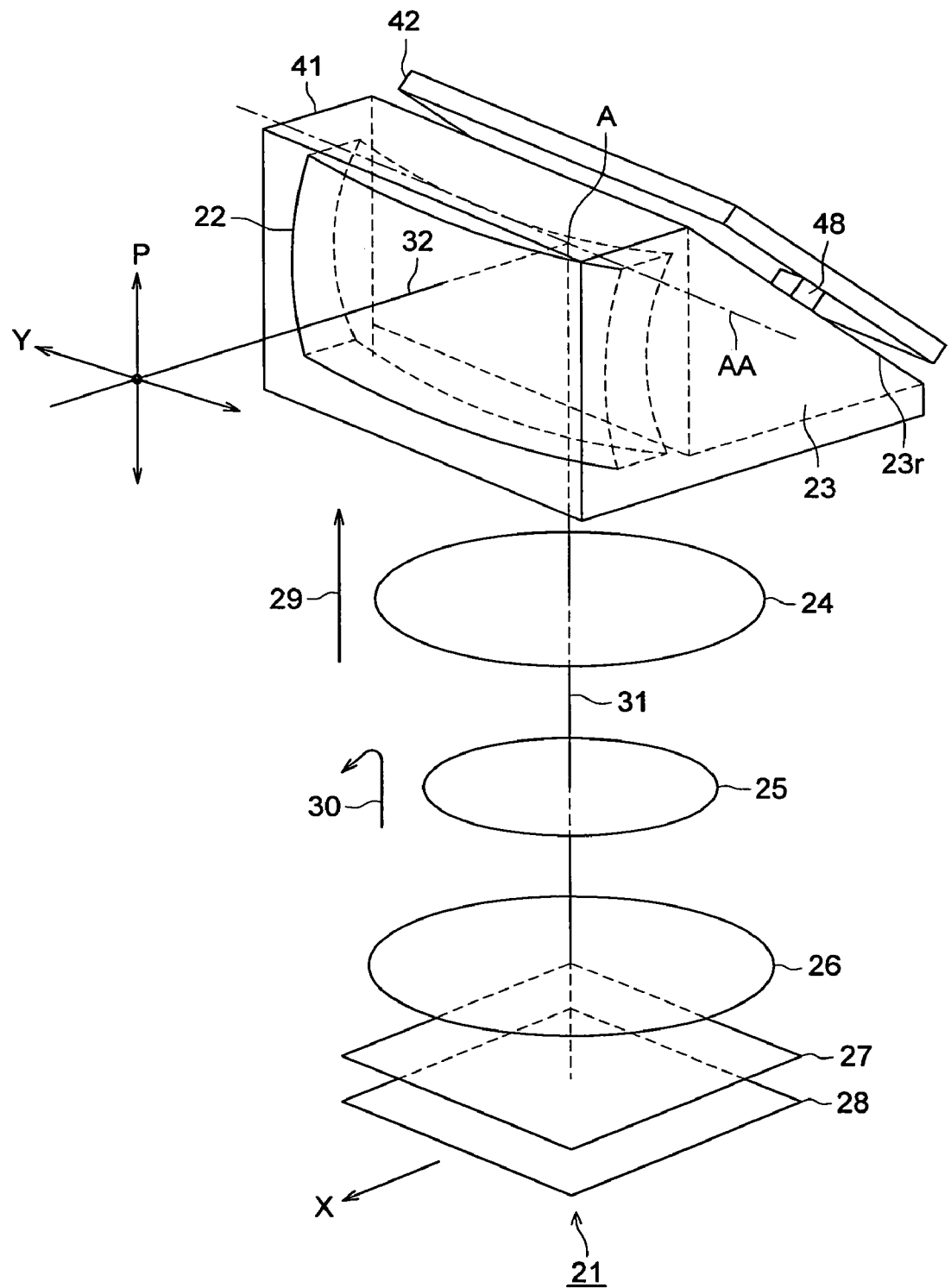
FIG. 1 illustrates a perspective view showing the configuration of the optical unit of the first embodiment of the present invention.

FIG. 1 illustrates a perspective view of an optical unit 21. In FIG. 1, a symbol 22 denotes the first lens group; a symbol 23 denotes a prism being a reflection member; a symbol 24 denotes the second lens group; a symbol 25 denotes the third lens group; a symbol 26 denotes the fourth lens group; a symbol 27 denotes a low pass filter; and a symbol 28 denotes an image pickup element. The first lens group 22 forms a front lens group positioned in an object side against the reflection member. The second lens group 24, the third lens group 25, the fourth lens group 26 form a rear lens group positioned in an image forming side against the reflection member. A symbol 32 denotes an optical axis of the front lens group and a symbol 31 denotes an optical axis of the rear lens group. The optical axis 32 and the optical axis 31 cross to a reflection surface 23r of the prism 32 at a point A. A straight line AA is a straight line passing on the point A and perpendicular to the optical axes 31 and 32. The optical unit 21 is an image forming optical system configured by the first lens group 22, the prism 23, the second lens group 24, the third lens group 25, the fourth lens group 26 and the low pass filter 27. The optical unit 21 forms the image of an object (not shown) onto the image pickup element 28. The second lens group 24 and the third lens group 25 are a variable magnification optical system and each of the second lens group 24 and the third lens group 25 moves along arrows 29 and 30 respectively. An arrow P denotes the pitch direction, which is parallel to the optical axis 31 and an arrow Y denotes the yaw direction, which is parallel to the straight line AA.

A symbol 41 denotes a lens case, in which the first lens group 22 and the prism 23 are fixed and installed. A symbol 42 denotes a back surface plate being a reference when driving the lens case, the back surface plate 42 being fixed onto a part of the housing (not shown) of the optical unit 21. A symbol 48 denotes a Y-direction position sensor for detecting the movement of the position of the lens case 41 in a Y (Yaw) direction against the back surface plate 42.

Figure 2:
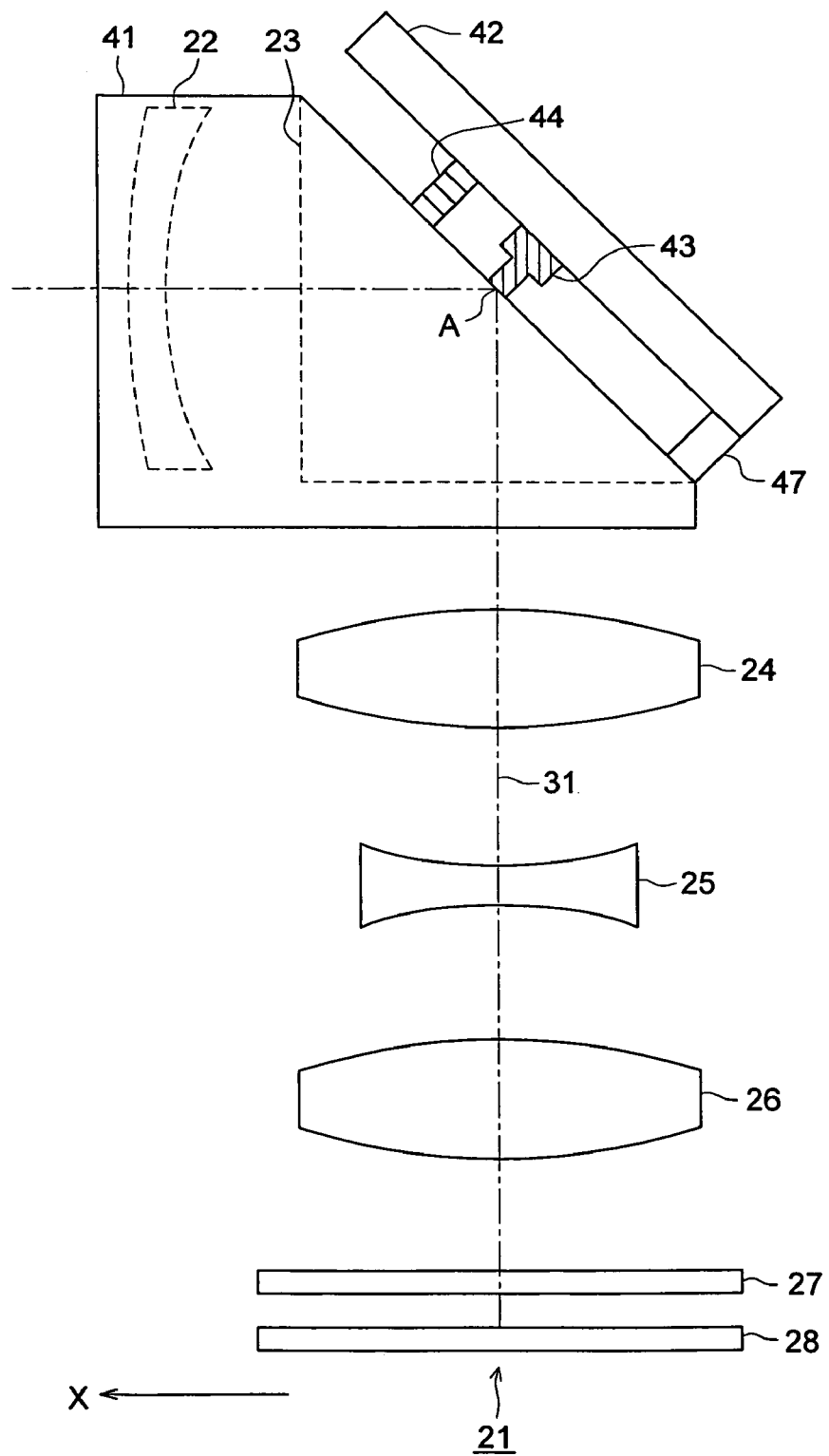
FIG. 2 illustrates a cross-sectional view showing the configuration of the optical unit shown in FIG. 1.

The cross sectional drawing of the optical unit is shown in FIG. 2. The same element having the same functionality as the element shown in FIG. 1 has the same numeral and the explanation will be eliminated. In FIG. 2, a symbol 43 is a support member for supporting a lens case 41 against a back surface plate 42, the support member being formed by resin and the support member connecting the lens case 41 and the back surface plate at a pivot point A. Accordingly, the lens case 41 is arranged to freely change angle centering on the support member 43. A symbol 44 is an actuator as a drive member utilizing a layered piezoelectric element. One end of the actuator 44 is adhered to the back surface of the lens case 41 and the other end of the actuator 44 is adhered to the back surface 42. A symbol 47 is a P-direction position sensor, which detects the movement of the lens case 41 in the P-direction (pitch) against the back surface plate 42.

Figure 3:
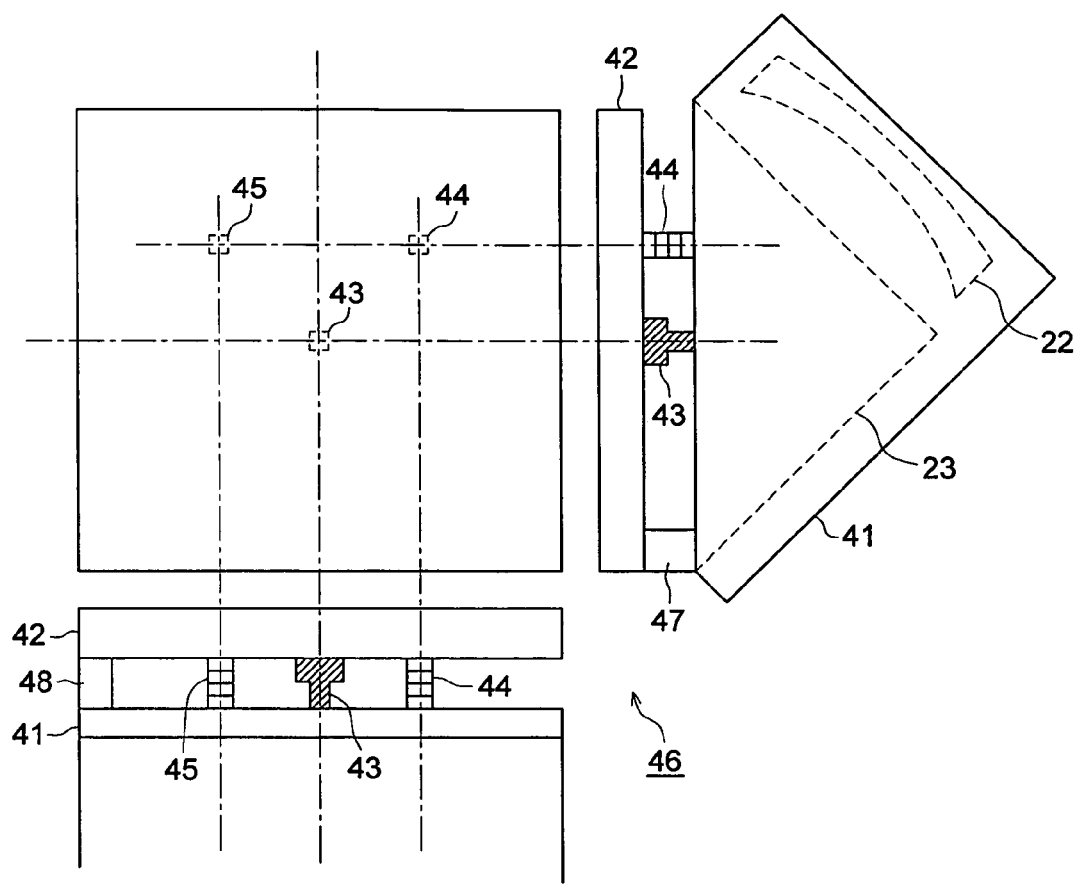
FIG. 3 illustrates a drawing viewed from the rear surface of the optical unit shown in FIG. 1.

FIG. 3 illustrates the optical unit 21 from the back surface plate 42 side. In FIG. 3, the same element having the same functionality as the element shown in FIGS. 1 and 2 has the same numeral and the explanation will be eliminated. In FIG. 3, symbols 44 and 45 denote actuators being drive members utilizing a layered piezoelectric element. One end of each actuator is adhered to the back surface of the lens case 41 and the other end is adhered the back surface plate 42. Accordingly, when extending and shrinking the actuator by changing the voltage applied to the actuators, the lens case 41 is driven referencing on the back surface plate 42 and centering on the support member 43.

For example, when simultaneously shrinking actuators 44 and 45, the lens case 41 rotates centering on the support member 43 in the arrow P direction shown in FIG. 1.

When shrinking one of the actuators 44 and 45 and extend the other one, the lens case 41 rotates centering on the support member 43 in the arrow Y-direction as shown in FIG. 1.

When the lens case 41 is driven in the pitch direction (in the arrow P direction in FIG. 1), the angle formed between the optical axes of the front lens group and the rear lens group changes. When the lens case 41 is driven in the yaw direction (in the arrow Y-direction in FIG. 1), the angle formed between the optical axes of the front lens group and the rear lens group does not change.

Figure 4:
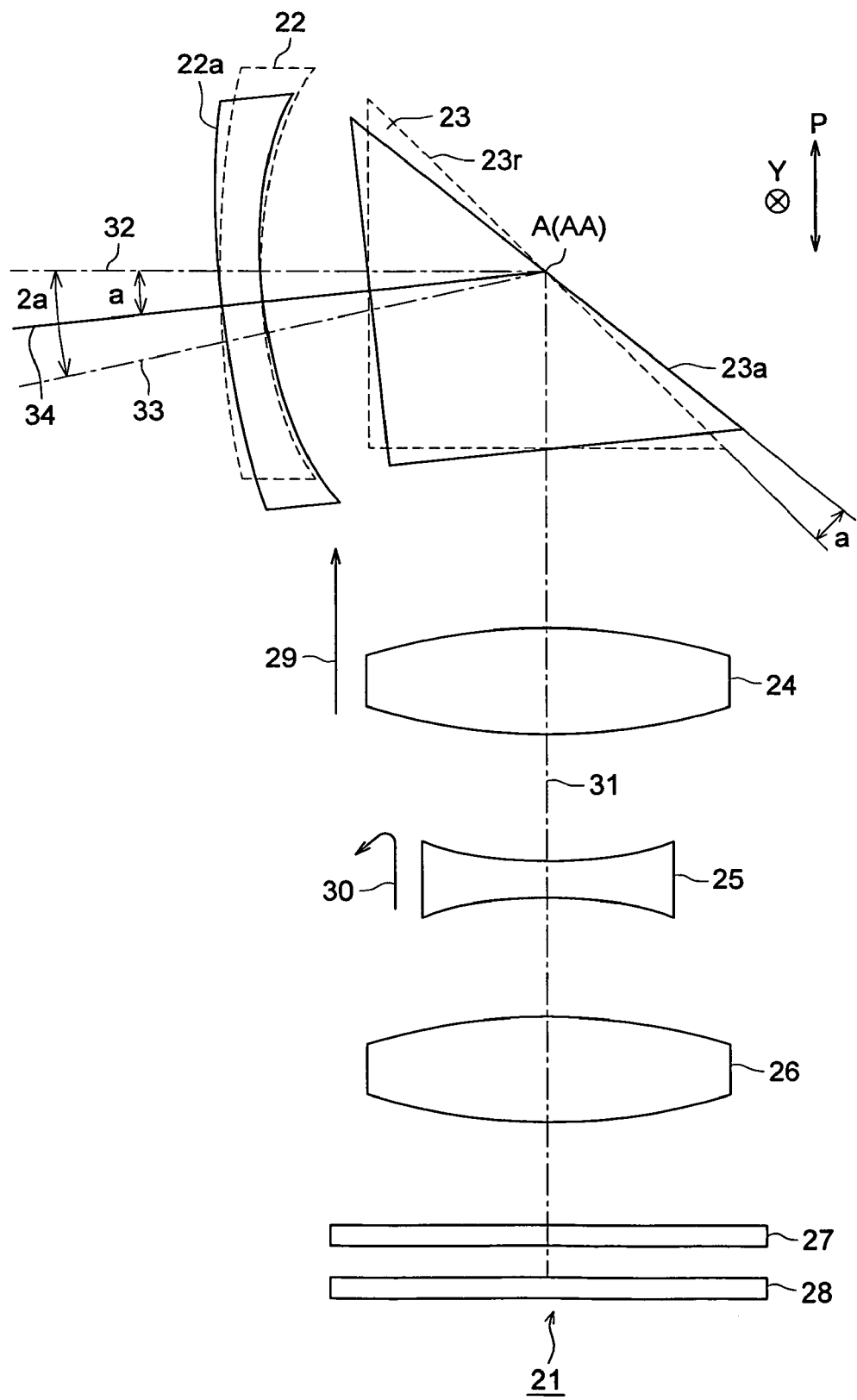
FIG. 4 illustrates a drawing showing the optical unit shown in FIG. 1.

FIG. 4 illustrates the configuration of the optical unit 21 of the first embodiment of the present invention. In FIG. 4, the same element having the same functionality as the element shown in FIG. 1 has the same numeral and the explanation will be eliminated. In FIG. 4, the arrow P denotes the up and down direction in the document of FIG. 4, and the arrow Y denotes the direction perpendicular to the document of FIG. 4.

Symbol 22a denotes the position of the first lens group rotated in the arrow P direction by angle "a" from the reference position centering on straight line AA extended in the arrow Y-direction and passing thorough the point A for shaking correction. Symbol 34 denotes the optical axis of the first lens group positioned at position 22a. Symbol 23a denotes the position of the prism driven by angle "a" in the arrow P direction from the reference position centering on the straight line AA to correct shaking. Symbol 33 denotes a line extended from the optical axis inflected by the prism at a position 23a.

In this embodiment, the front lens group and the rear lens group are driven as one body, and the angle formed between the optical axes of the front lens group and the rear lens group changes based on the drive.

In FIG. 4, when the prism positions at the reference position, a light flux traveling on the optical axis 32 of the first lens group 2 is inflected by 90° and travels on the optical axis 31 after provided a total reflection by the prism 23 positioned at the reference position.

When the prism 23 positions at position 23a, which is inflected by angle "a" from the reference position, a light flux 33 which is rotated by angle "2 a" from the optical axis 32 is inflected by angle "(90–2 a)" by the prism positioned at the position 23a. Then the light flux 33 travels on the optical axis 31. Namely, the optical axis of the front lens group are inflected by angle "2 a". Consequently, in order to eliminate aberration caused by the inflection of the optical axis, it is ideal that the first lens group 22 is rotated by angle "2 a" centering on the straight line AA. However, in this embodiment, as it will be described later since the first lens group 22 is structured to be driven together with the prism 23 as one body, the first lens group 22 is rotated by angle "a".

In the case of this embodiment, the amount of rotation of the first lens group 22 is half of the ideal case. However, comparing with the case that the first lens group is not rotated at all as a conventional optical unit, the aberration amount is clearly improved.

Figure 5:
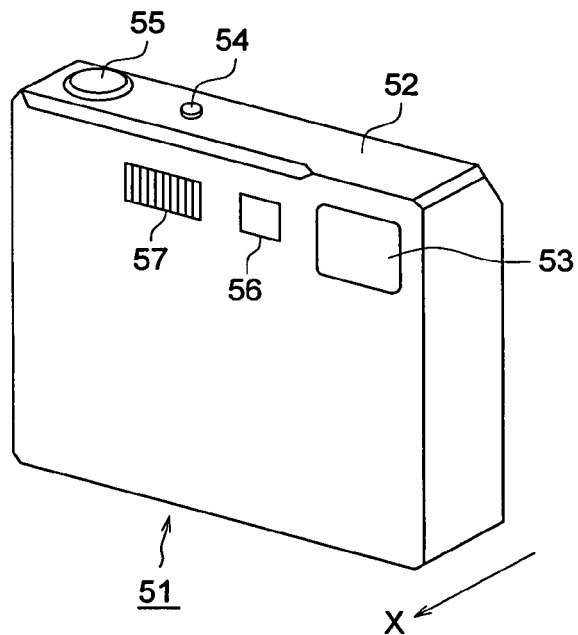
FIG. 5 illustrates a perspective view of the digital camera of the embodiment of the present invention.

Next, an image pickup apparatus in which the optical unit of the present invention is applied will be described. FIG. 5 illustrates a perspective view of a digital camera adopting an optical unit of the embodiment of the present invention.

In FIG. 5, a symbol 51 denotes the digital camera; a symbol 52 denotes a main body of the digital camera 51; a symbol 53 denotes an opening for guiding the light flux from an object (not shown) to an image pickup element through an optical unit; a symbol 54 denotes a power switch for turning power of the digital camera on and off; a symbol 55 denotes a shutter button being an operation button for conducting photography; a symbol 56 denotes an opening of an optical finder and a symbol 57 denotes a flash for irradiating an object by emitting lights when dark.

The shutter button 55 can switch photography states into three steps. Namely, the three steps are firstly a photography standby state, OFF-state, when the shutter button 55 has not been pushed; secondly, a photography preparation state when the shutter button 55 is in a half push state where S1 switch is ON; and thirdly, a photography start state, when the shutter button 55 is fully pushed where S2 switch is ON.

An arrow X direction in FIG. 5 denotes the same arrow direction shown in FIG. 2, and the optical unit 21 is installed in a camera body 52 so that the both arrow-directions coincide each other. The first lens group 22 is disposed in the opening 53.

Figure 6:
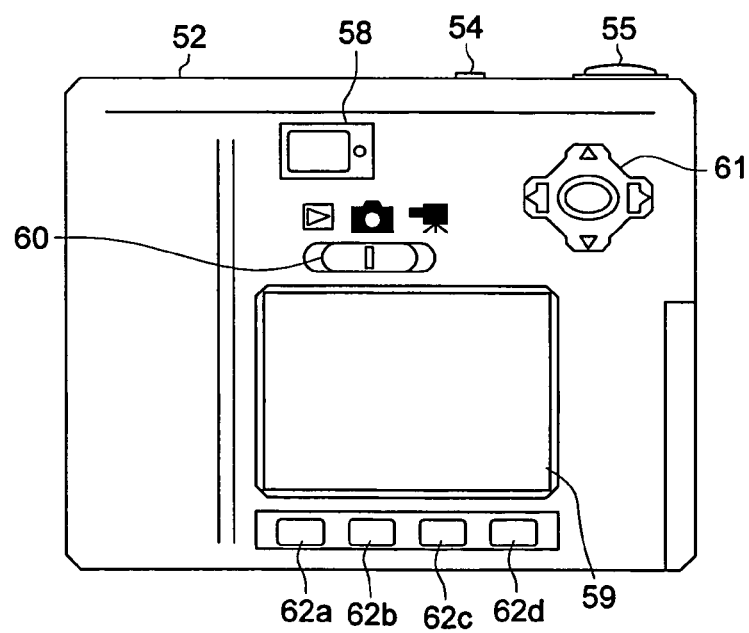
FIG. 6 illustrates a rear surface drawing of the digital camera shown in FIG. 5.

FIG. 6 is a drawing showing the backside of the camera 51 of the present invention.

In FIG. 6, the same element having the same functionality as the element shown in FIG. 5 has the same numeral and the explanation will be eliminated. In FIG. 6, a symbol 58 denotes a viewfinder; a symbol 59 denotes a LCD (Liquid Crystal Display) for displaying various information related to a electronic finder and the photography; and a symbol 60 denotes a function switch for selecting a function from three functions such as a reproduction function of photographed images, a photographing function of s still images and a photographing function of moving images. A symbol 61 denotes a jog dial for moving a cursor displayed on the LCD 59 and is used for zooming operation of a photographic lens. Symbols 62a, 62b, 62c and 62d denote a setting button group used for displaying menu on the LCD 59, handling picture flames of reproduced images, magnifying and reduction the image and setting deletion etc., of the photographed images. A setting button 62d is an ON/OFF button for setting the on-off of the camera shaking prevention function.

Figure 7:
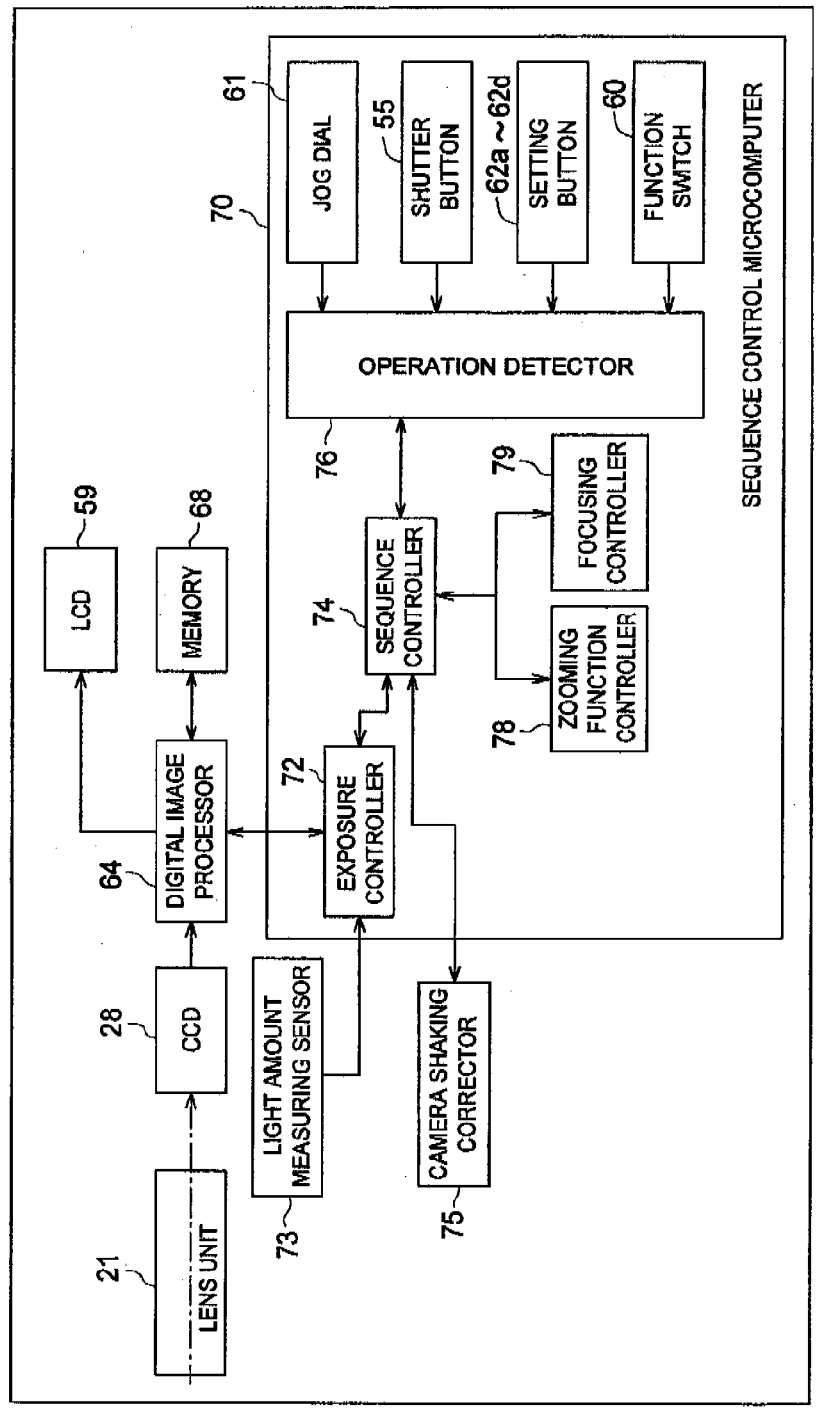
FIG. 7 illustrates a system diagram of the digital camera of the first embodiment of the present invention.

Next, the system configuration of a digital camera 51 will be described by referring to FIG. 7.

The optical unit 21 guides an object image onto an image pickup element 28, such as CCD. The image pickup element 28 outputs image signal after conducting photo-electronic conversion of the object image. The image signal from the image pickup element 28 is outputted to the LCD 59 and stored into a memory 68 after applying a black and white level correction process, a color pixel interpolation process, an exposure correction process, a γ(gamma)-correction process, a contrast correction process, a sharpness correction process, a resolution conversion process, an image compression process which are necessary for digital image processing at the digital signal processor 64. The memory 68, for example, may be a flash memory capable of recording photographic images, taking out and inserting into the digital camera 51.

A sequence control microcomputer 70 conducts the sequence control of a camera. The sequence control microcomputer 70 includes an exposure controller 72, a sequence controller 74, an operation detector 76, a zooming controller 78 and a focusing controller 79. An operation detector 76 detects the state of various switches 56, 60, 61, and 62a-62d of the camera and transmits the state to a sequence controller 74. The sequence controller 74 controls the sequence (operational states) of the camera 51 based on the state of various switches 56, 60, 61, and 62a-62d of the camera. An exposure controller 72 sets the exposure state of the camera based on the output of a light amount-measuring sensor 73 and controls the exposure time of the image pickup element 28 and the open/close of a shutter (not shown). A zooming controller 78 changes the focal length of a photographic lens in response to the operation of the jog dial 61. A focusing controller 79 detects the contrast state of the image formed on an image pickup element 28, decides the optimum focus position and drives a focusing lens in the photograph lens.

A camera shaking corrector 75 executes camera shaking correction operation in response to the command from a sequence controller 74.

The digital camera 51 practically operates as following under the control of the sequence control microcomputer 70. Namely, when the shutter button 55 is half-pressed, a LCD 59 displays live-view image until the time runs and moves to a sleep state by the auto-power off function (standard time is set at about 30 seconds). The sequence control microcomputer 70 controls a light amount measuring sensor 73 to set an exposure control value when the shutter button 55 is half-pressed. Further the sequence control microcomputer 70 detects a focus position for focusing. When a camera shaking ON/OFF button is on, the sequence control microcomputer 70 conducts camera shaking correction. When detecting that the shutter button 55 is fully pressed, the sequence control microcomputer 70 controls the image pickup element 28 to take the object image and records the photographed image into a memory 68. When a camera shaking ON/OFF button is on, the sequence control microcomputer 70 conducts camera-shaking correction.

Next, camera shaking correction operation of a camera will be described by referring to drawings.

The camera shaking caused when photographing an object by a camera includes vibration synthesized by small amplitude vibration of about 10 Hz caused by a vibration of human mussel, large amplitude vibration of 3 Hz or less caused by swing of human body and large amplitude vibration of 5 Hz being caused by shaking when operating the shutter button 55. A system configuration to realize the camera shaking correction will be illustrated in FIG. 8.

When camera shaking occurs with the digital camera 51 due to the shake of a photographer, an optical path guided to the receiving surface of an image pickup element 28 changes while photographing by using the image pickup element 28. As a result, an object image moves and overlaps while exposing. Consequently, an unclear and blur image is photographed. In order to correct or compensate the blur image, it is necessary to detect the shaking generated with the camera, change the optical path so as to cancel the movement of the image forming position caused by the shake on the image pickup element 28 and to form the image on the same position.

Figure 8:
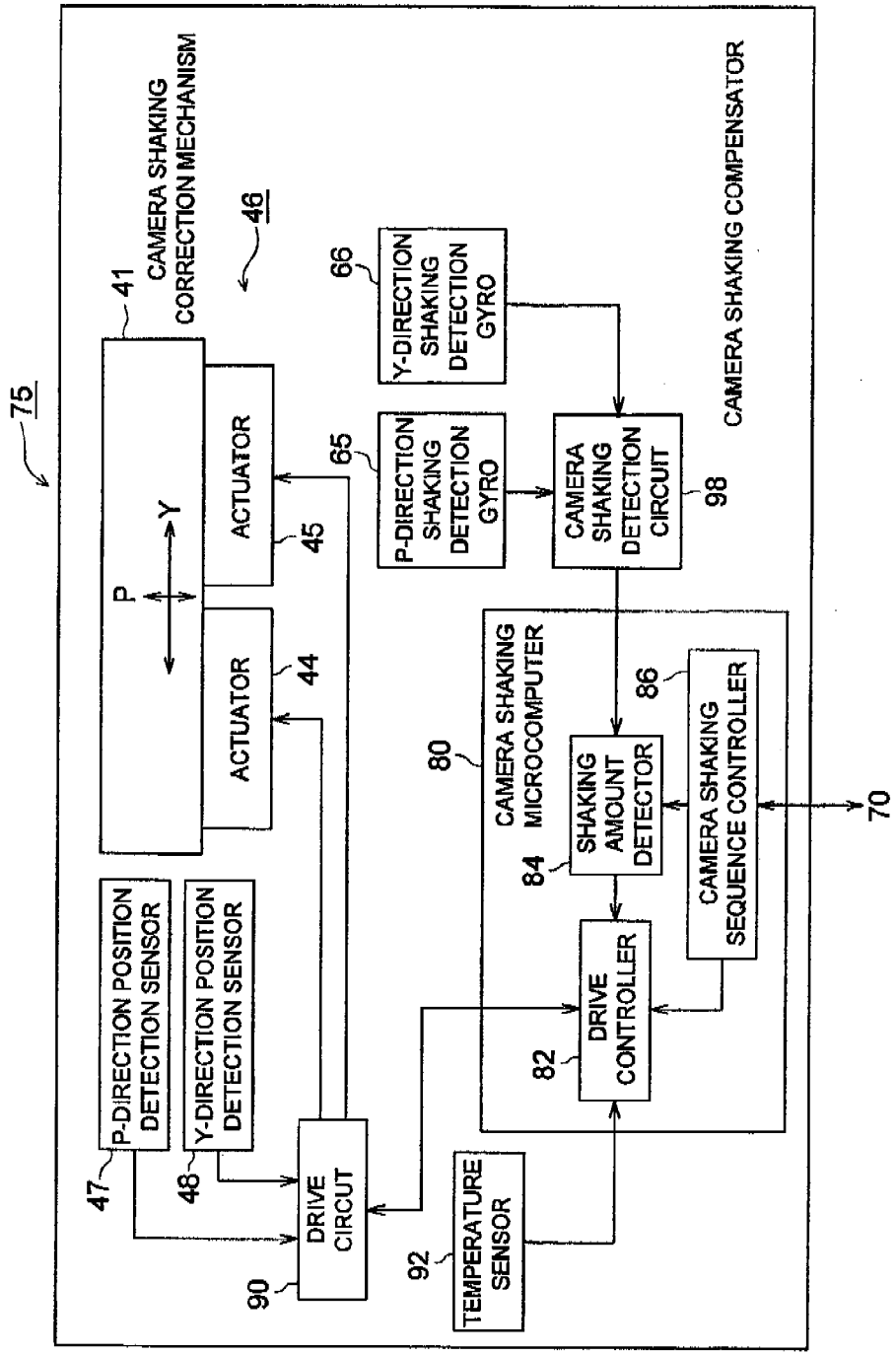
FIG. 8 illustrates a system diagram of the camera shaking controller in the system shown in FIG. 7.

FIG. 8 illustrates a system configuration of camera shaking controller 75 for realizing the camera shaking correction or correction.

A camera shaking correction mechanism 46 comprises a P-direction position detection sensor 47, Y-direction position detection sensor 48, actuators 44 and 45. A camera shaking microcomputer 80 for controlling camera shaking is arranged to communicate with a sequence control microcomputer 70 and a driving circuit 90 for driving camera shaking correction mechanism 46, a camera shaking detection circuit 98 and a temperature sensor 92 are connected with the camera shaking microcomputer 80.

Described below will be a gyro (an angular velocity sensor) detection method as a detection system, an inflection prism as a correction optical system, a layered type piezoelectric element for directly driving the optical element as a driving system and a digital servo control system employing a position detection sensor.

When camera shaking occurs with the digital camera 51, the blur of photographic image on the surface of the image pickup element occurs and results in a photograph having a blurred image thereon. However, it becomes possible to prevent the occurrence of the blurred image by detecting the shaking amount by the detecting system and inflecting the light from the object in the direction to which a correction optical system is moved to cancel the movement of the object image. Sine wave vibration having the maximum frequency of 10 Hz occurs with the camera shaking. In order to correct the blur of the photographic image, the correction optical system is driven so that the blur caused by the vibration is prevented.

A P-direction shaking detection gyro 65 and a Y-direction shaking detection gyro 66 are gyro sensors for detecting shaking of the main body of the digital camera 51, the gyro sensors detecting the angular velocity signal when the main body of the digital camera 51 rotates due to the shaking. Since each gyro detects the rotational angular velocity in one direction, the P-direction shaking detection gyro 65 detects the rotational shaking in the p (pitch) direction and the Y-direction shaking detection gyro 66 detects the rotational shaking in the Y (yaw) direction.

A shaking detection circuit 98 comprises a filter circuit (a low pass filter and a high pass filter) for cut gyro signal noise and drift of the P-direction shaking detection gyro 65 and the Y-direction shaking detection gyro 66, and an integration circuit for converting an angular velocity signal to a angular signal.

The inside of the block of camera shaking microcomputer 80 being a camera shaking controller is a digital signal processor of a microcomputer. A shaking amount detector 84 takes in the rotational shaking amount of P and Y directions from shaking detection circuit 98 with a predetermined time interval and outputs shaking amount of the camera. A camera shaking sequence controller 86 controls the camera shaking sequence in response to the signal from the camera sequence control microcomputer 70. A drive controller 82 sets the correction driving position based on the shaking output from the shaking amount detector 84. Further, the drive controller 82 corrects the changing amount of the correction driving position drifted by the temperature change by utilizing the output of a temperature sensor 92. The drive controller 82 decides the optimum control value (in the case of the actuator, the control value is a voltage) and output it to the driving circuit 90 by detecting the current position signal outputted from drive circuit 90 against the drive position decided by the method described above.

The temperature sensor 92 is utilized to correct the performance change by temperature. Further, the temperature sensor 92 is utilized to correct the temperature change of a correction optical system and/or a position detection sensor. When necessary, the temperature sensor 92 is used to correct the driving voltage of the actuator and realizes the optimum correction under current temperature.

A driving circuit 90 comprises a drive circuit for outputting the calculation results calculated by the drive controller 82 to actuators 44 and 45 and a position sensor circuit for changing signals from P and Y direction sensors 47 and 48 to voltage values.

When the actuators 47 and 48 drive a lens case 41, correction mechanism 46 inflects the light flux from an object in the predetermined direction. As a result, it becomes possible to correct the shaking. The actuators 47 and 48 employ a direct drive system which uses a layered piezoelectric element in the embodiment of the present invention.

A P-direction position sensor 47 is a position-detecting sensor for detecting the movement in the P-direction of the lens case 41. In this embodiment, the P-direction position sensor 47 is configured by installing an IRLED (Infrared Light Emitted Diode) and a slit in the lens case being a moving side and a PSD (Position Sensitive Detector) on a back surface plate being a fixed side.

A Y-direction position detection sensor 48 is a position detecting sensor for detecting the movement in the Y-direction of the lens case 41. The same as the P-direction position sensor 47, the Y-direction position sensor 48 is configured by installing an IRLED and a slit in the lens case being a moving side and a PSD on a back surface plate being a fixed side.

According to the embodiment of the present invention, the front lens group is driven in response to the drive of the prism. Accordingly, comparing with a method for driving only a prism as the conventional method does and a method for shifting a lens, the degradation amount of the optical characteristics of the optical unit becomes lower. Further, since the front lens is driven in response to the shift of the optical axis, it is not necessary to make the diameter of the front lens large. Consequently, it becomes possible to provide a small sized and light weighted optical unit.

According to the embodiment of the present invention, since the image pickup element is not shifted, it is not necessary to make the image circle size large.

Further, according to the embodiment, since the driving amounts of the front lens and the prism are controlled the same amount, it is possible to provide an optical unit having a low degrading amount of the optical characteristic and a shaking correction function by driving the front lens and the prism integrally, which is a simple method.

According to the embodiment of the present invention, since a driven front lens group is only the first lens group, the driving mechanism becomes simple and small. Further, since the lens group positioned in the object side with respect to the reflecting member is only the first lens group, the amount of inflection of the optical axis does not become large and the driving amount can be maintained small.

According to the embodiment of the present invention, since the optical unit is a zoom lens having a variable magnification optical system, it becomes possible to provide a photographic lens with which the decision of the image angle when photographing is easy.

THE SECOND EMBODIMENT

The difference between the first and the second embodiment is that the front lens group and the prism in the second embodiment differently move while the first lens group and the prism are driven in one body in the first embodiment. Further, in response to the moving by angle "a" in the P-direction of the prism, the driving angle of the front lens is going to be angle "2 a" in the second embodiment.

The second embodiment of the present invention will be described below.

Figure 9:
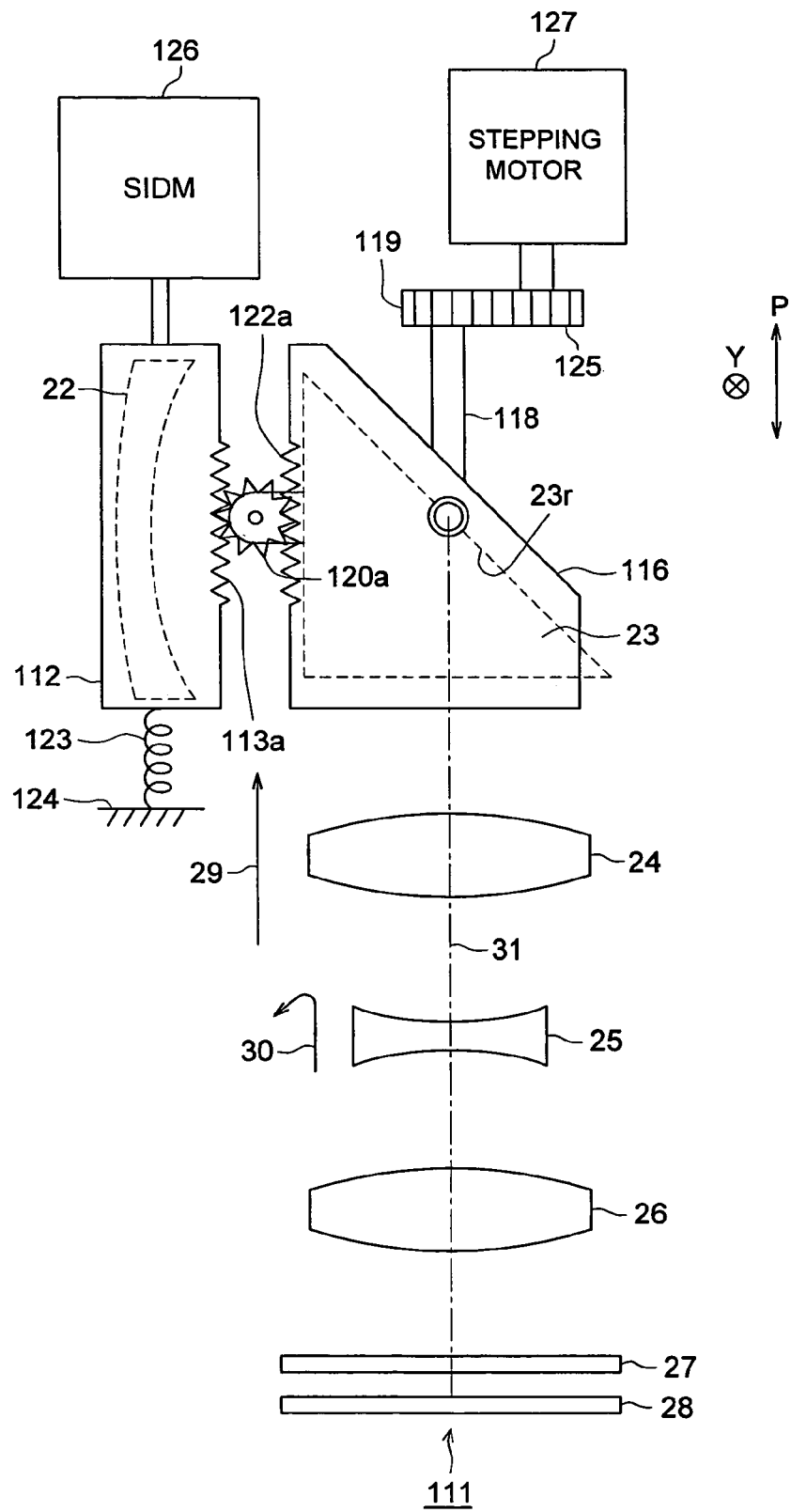
FIG. 9 illustrates an assembly drawing of the optical unit of the second embodiment of the present invention.

FIG. 9 illustrates a configuration of an optical unit 111 of the embodiment. In FIG. 9, the optical unit 111 employs the same optical design as the first embodiment. The same element having the same functionality as the element shown in FIG. 4 has the same numeral and the explanation will be eliminated. In FIG. 9, a symbol 112 is the case of the first lens group, which includes the first lens group 22. Rack gears 113a and 133b (not shown) are formed on a part of surface of the first lens group case 112 opposed to the prism 23. A symbol 116 is a prism cover, which stores a prism 23. In the prism cover 116, a Y-rotation axis 118 is formed in a direction parallel with an optical axis 31 from a periphery of the point A where the optical axis 31 and a prism reflection surface 23r cross each other. A driving gear 119 is formed in the front edge of the Y-rotation axis 118. Rack gears 122a and 122b (not shown) are formed on the part of the prism cover 116 opposed to the first lens group 22.

Figure 13:
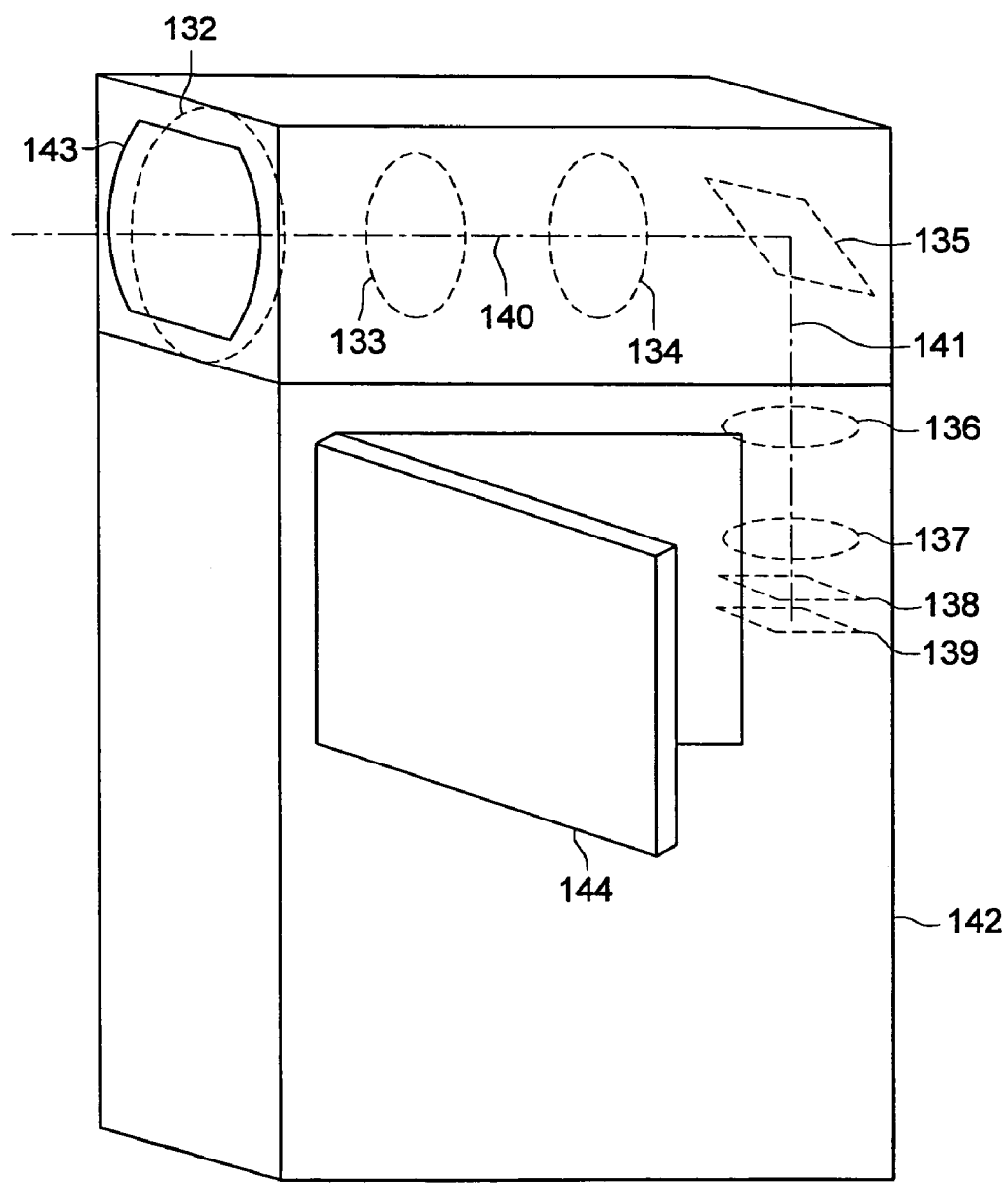
FIG. 13 illustrates a configuration of the video camera of the third embodiment of the present invention.
Figure 14:
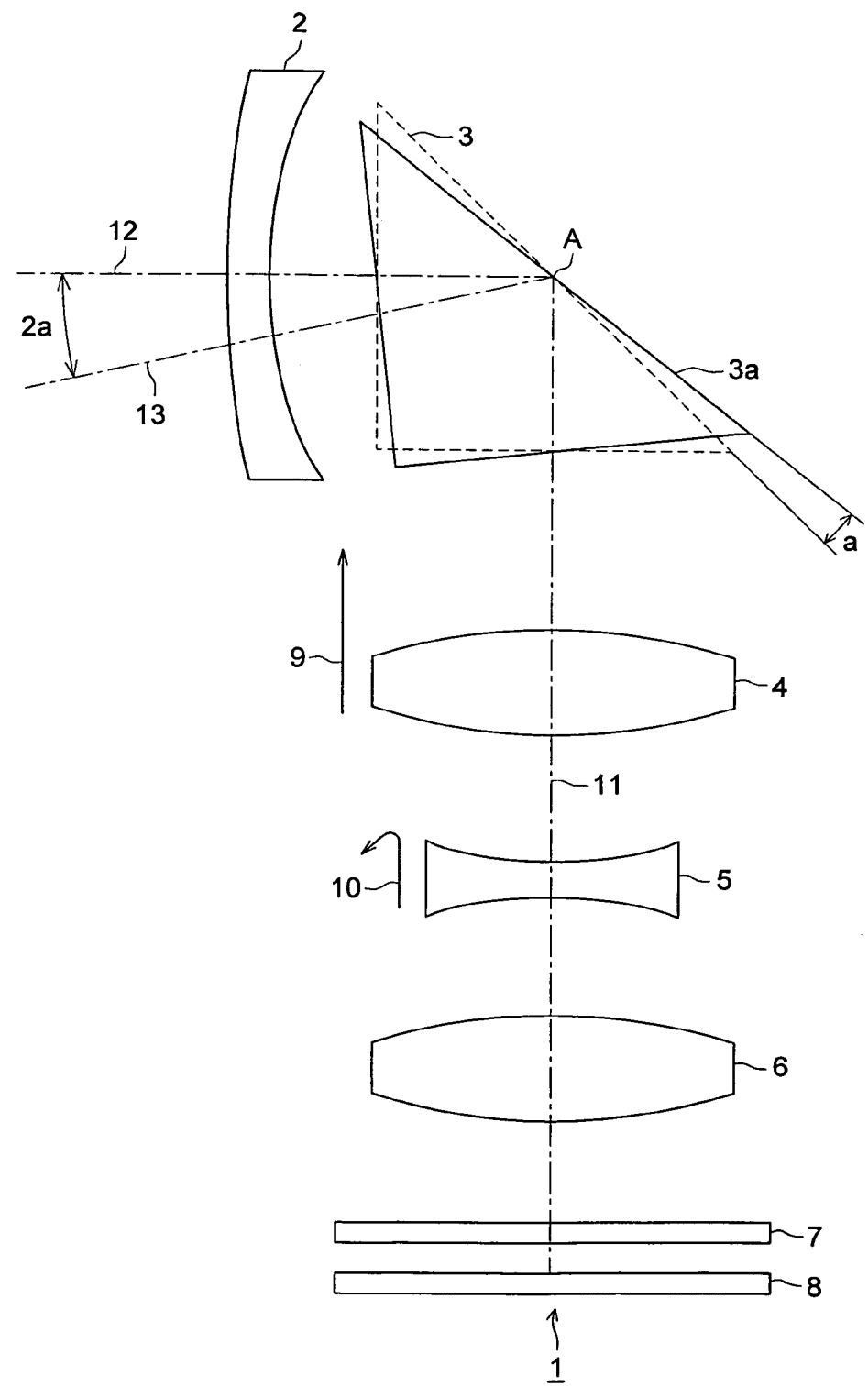
FIG. 14 illustrates a configuration of the optical unit having a shaking correction function of the conventional art.

The first lens group case 112 is disposed in a place where the rack gears 113a and 122a hold a planetary gear 120a in between. The first lens group case 112 is charged from one direction by a spring 123 against a part of housing 124 of the optical unit 111. A SIDM (Smooth Impact Drive Mechanism) 126 is disposed on the side opposed to the spring 123 of the first lens case 112, and is arranged to drive the first lens group case 112 in the up and down direction of the paper sheet on which FIG. 13 is illustrated.

A stepping motor 127 is connected with a Y-drive gear 119 through Y-relay gear 125, and the first lens group 22 and the prism 23 rotate as one body into the Y-direction (yaw direction) centering on Y-rotation axis 118 by rotating of the stepping motor 127. A camera shaking corrector (not shown) drives the SIDM 126 and the stepping motor 127 as the same as the first embodiment.

Figure 10:
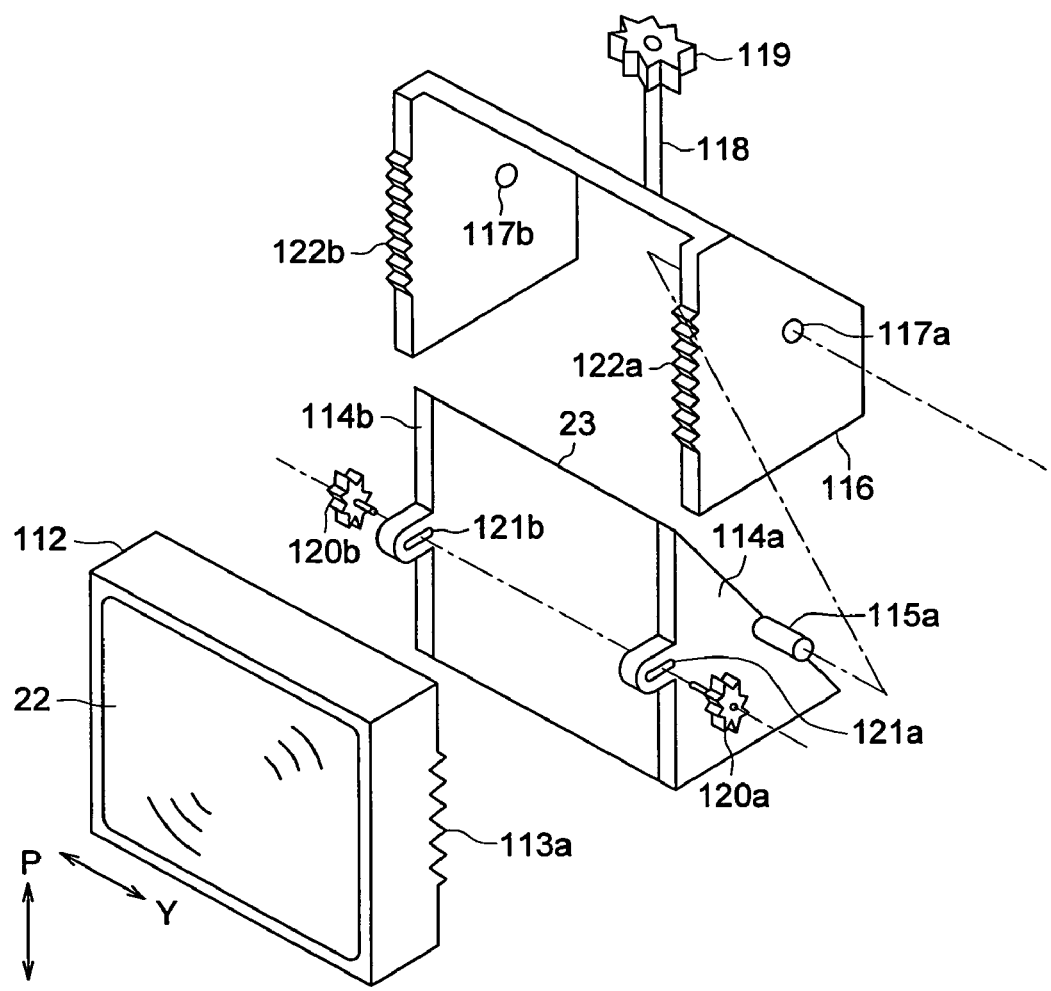
FIG. 10 illustrates a drawing showing a part of the optical unit shown in FIG. 9 in detail.

FIG. 10 is a drawing illustrating the configuration of the first lens group 22 and the prism 23 which are shown in FIG. 9 in detail. The first lens group 22 is stored in the first lens group case 112 and the rack gear 113a is formed in a part of surface of the first lens group case 112 opposed to the prism 23. A rack gear 113b (not shown) is formed on the other side of the first lens group case 112 opposed to the side in which the rack gear 113a is formed.

Side surface plates 114a and 114b hold the prism 23 in between. Long holes 121a and 121b are formed in portions of the side surface plates 114a and 114b, which are opposed to the first lens group 22. The axes of planetary gears 120a and 120b are fitted to each long hole so that the axes freely rotate. P-rotational axes 115a and 115b (not shown) are formed on one side of each side surface plate 114a and 114b. The straight line connecting between the positions of P-rotational axes 115a and 115b pass periphery of the point A where the optical axis 31 of the rear lens group and the reflecting surface of the prism 23 cross and the angle formed by the straight line connecting between the positions of P-rotational axes 115a and 115b and the optical axis 31 is 90°.

A prism cover 116 stores the prism 23 and side surface plates 114a and 114b, and the P-rotation axes 115a and 115b fit the holes 117a and 117b of the prism cover 116 so that the P-rotation axes 115a and 115b freely rotate. A Y-rotation axis 118 is formed from a periphery of the point A in the direction parallel with the optical axis 31. A driving gear 119 is formed in front edge of thee Y-rotation axis 118. As described above, the prism 23 is arranged to freely rotate the P and Y directions. Further, the rack gears 122a and 122b are formed on the portion of the prism cover 116 opposed to the first lens group 22.

The arrows P and Y denote respectively the P-direction (the pitch direction) and the Y-direction (the yaw direction).

Since the configuration is set as what is described above, in FIG. 9, when moving the first lens group case 112 in the up and down direction of the document on which FIG. 9 is drawn, due to the actions of planetary gears 120a and 120b, the angle of the prism 23 changes the half of the shift amount of the first lens group case 112.

Figure 11:
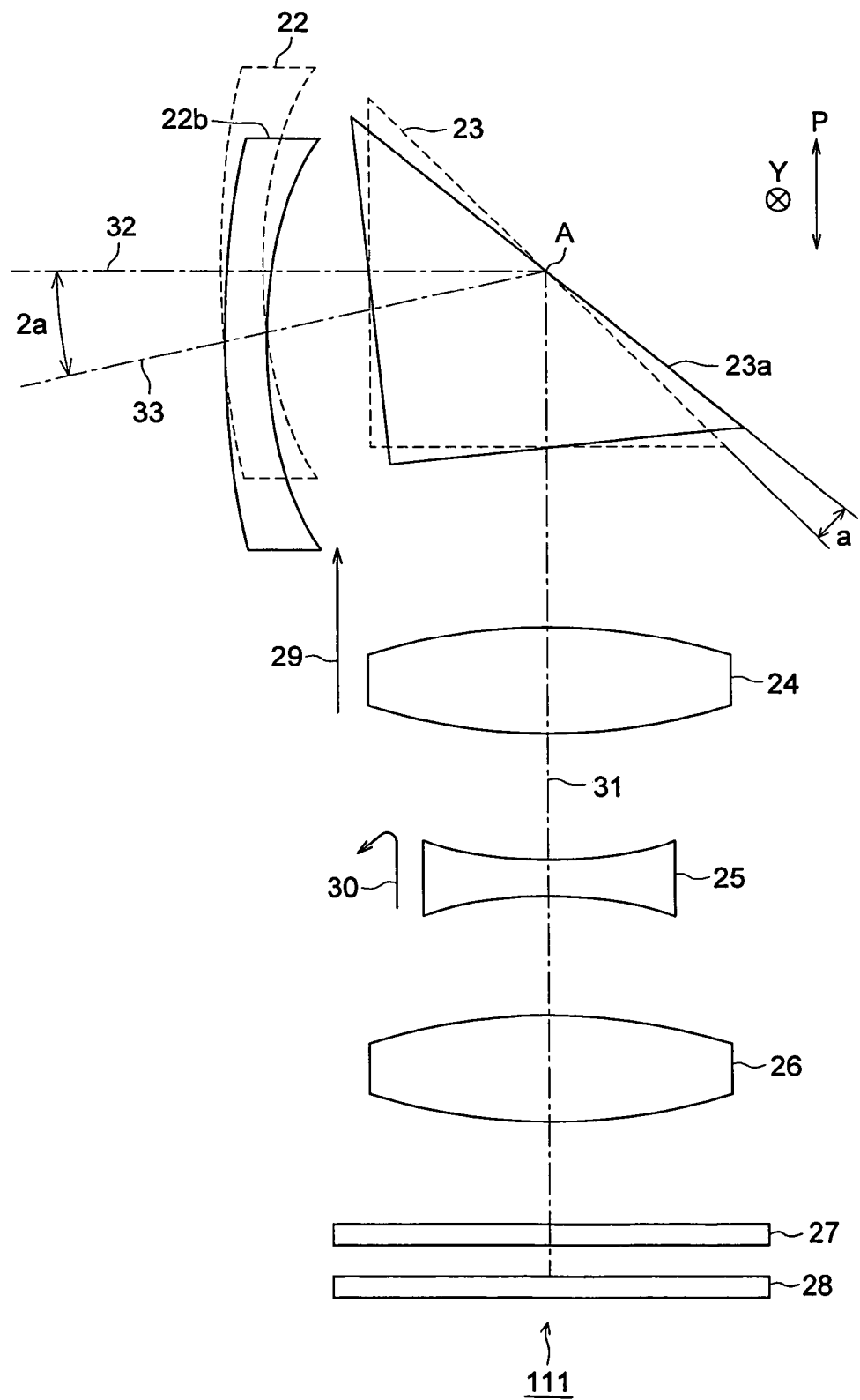
FIG. 11 illustrates the configuration of the optical unit shown in FIG. 9.

FIG. 11 illustrates the configuration of the optical unit 111 of the embodiment of the present invention. In the FIG. 11, the same element having the same functionality as the element shown in FIG. 4 has the same numeral and the explanation will be eliminated.

The difference between FIG. 11 and FIG. 4 is that in FIG. 4, the moving angle of the first lens group 22 is the same angle of "a" against the moving angle of "a" in the P-direction of the prism 23, however, in FIG. 11, the first lens group 22 is shifted to the position 22b where the moving angle "2 a", against the moving angle of "a" of in the P-direction of the prism 23.

The reason why this embodiment is useful is that in FIG. 11, when the prism 23 is driven angle of "a" in the P-direction, the extension of the optical axis 31 of the rear lens group is reflected by the prism 23 and the angle is changed "2 a". As a result, the extension of the optical axis 31 runs on the straight line 33. Consequently, it becomes possible to suppress the optical characteristic degradation of the optical unit 21 by shifting the first lens group 22 to the position 22b.

When the prism 23 is driven in the Y-direction, and the extension of the optical axis 31 of the rear lens group is reflected by the prism 23, since the reflected angle of the optical axis changes the same angle of the driving angle of the prism 23, the first lens group 22 is arranged to shift the same driving angle of the prism 23.

In the second embodiment, the first lens group 22 is driven twice as much as the movement of the prism 23 in the P-direction (in the pith direction). Further, the first lens group 22 is driven the same as the movement of the prism 23 in the Y-direction. Accordingly, the optical characteristic degradation of the optical unit 111 caused by the movement of the prism 23 becomes smaller than that of the first embodiment.

In the second embodiment, the movement amounts in the Y-direction of the front lens group and the prism are arranged to be the same. The movement amounts in the P-direction of the front lens group and the prism are arranged so that the movement amount of the front lens group is twice as much as that of the prism. Accordingly, it becomes possible to realize the necessary drive system with a simple mechanism and to provide a small sized and light weighted optical unit.

THE THIRD EMBODIMENT

The third embodiment of the present invention will be described by referring to drawings.

In the first and second embodiments, a single lens configures the front lens group located in the optical object side of the reflection member. In the third embodiment, a plurality of lens groups configures the front lens groups.

Figure 12:
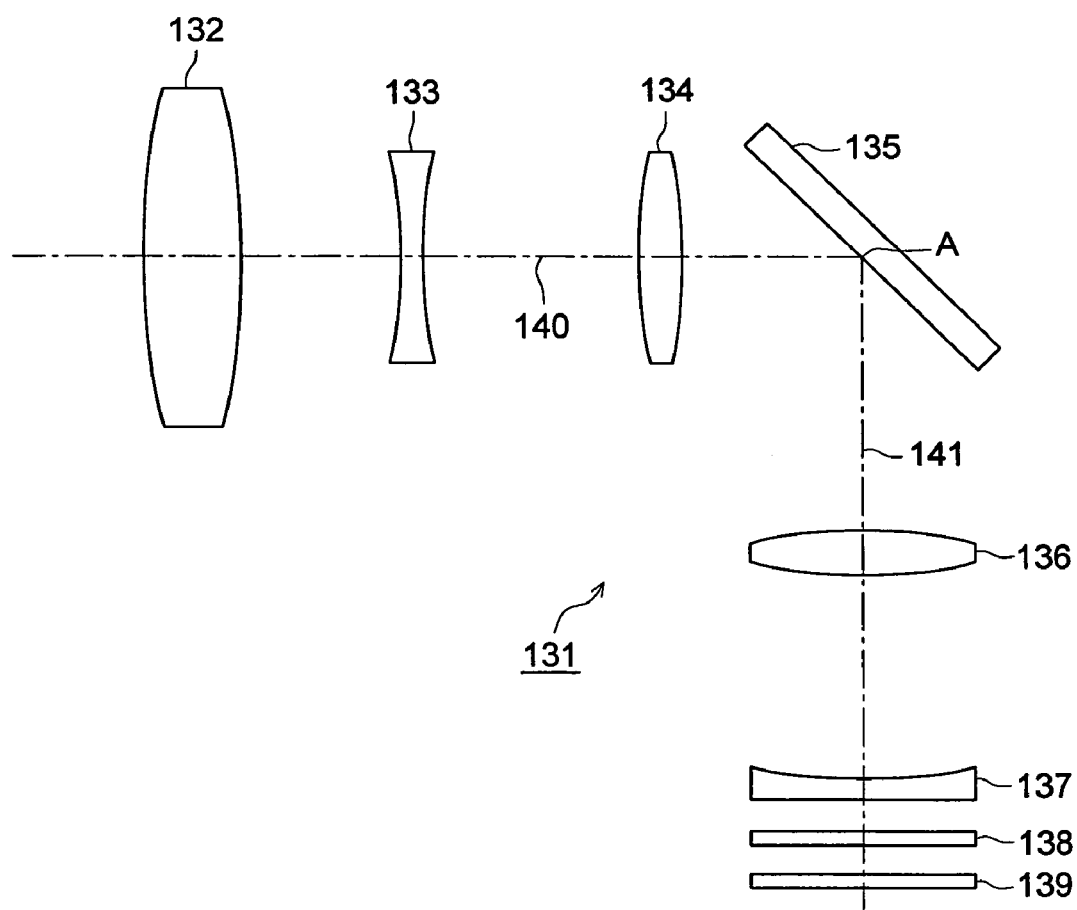
FIG. 12 illustrates a configuration of the optical unit of the third embodiment of the present invention.

FIG. 12 illustrates the configuration of an optical unit 131 of the third embodiment. A symbol 132 denotes the first lens group; a symbol 133 denotes the second lens group; a symbol 134 denotes the third lens group; and a symbol 135 denotes a reflection mirror being a reflection member for inflecting the optical axis of the optical axis. A symbol 136 denotes the forth lens group; a symbol 137 denotes the fifth lens group; a symbol 138 denotes a low pass filter; and a symbol 139 denotes an image pickup element. The first lens group—the third lens group configures a front lens group, which is located in the object side in respect to the reflection member. The fourth lens group 136 and the fifth lens group 137 configure a rear lens group located in the image side in respect to the reflecting member. A symbol 140 denotes the optical axis of the front lens groups and a symbol 141 denotes the optical axis of the rear lens group, both of the axes cross with the reflection mirror 135 at a point A.

A lens case (not shown) stores the front lens group and the reflection mirror 135. The lens case is driven centering on the point A so that the angle formed by the optical axis 140 of the front lens group and the optical axis 141 of the rear lens group changes.

FIG. 13 illustrates a perspective view of the configuration of the video camera of the third embodiment. In FIG. 13, the same element having the same functionality as the element shown in FIG. 12 has the same numeral. A symbol 142 denotes a camera body; a symbol 143 denotes an aperture window of photographic lens; and a symbol 144 denotes a folding type liquid crystal monitor.

The optical unit 131 of the third embodiment comprises a front lens group configured by a plurality of lens groups. The size of the front lens group located in the object side in respect to the reflection mirror 135 is larger than that of the optical unit of the embodiment 1 and embodiment 2. Accordingly, it is preferable that the optical unit 131 of the third embodiment is used in the camera having a front lens group, the thickness of which in the optical axis direction is large like a video camera.

While the preferred embodiments of the present invention have been described using specific terms, such description is for illustrative purposes only, and it is to be understood that changes and variations may be made without departing from the sprit or scope of the appended claims.

What is claimed is:

1. An optical unit for forming an object image, comprising:
    a reflection member for bending an optical axis of the optical unit;
    a front lens group arranged closer to an object side of the optical unit than the reflection member;
    a rear lens group arranged closer to an image forming side of the optical unit than the reflection member; and
    a driver for driving the optical unit,
    wherein the driver drives the reflection member and the front lens group
        in a first direction changing an angle formed between an optical axis of the front lens group and an optical axis of the rear lens group and
        in a second direction not changing the angle formed between the optical axis of the front lens group and the optical axis of the rear lens group.

2. The optical unit of claim 1,
    wherein the first direction is a pitch direction, and
    the second direction is a yaw direction.

3. The optical unit of claim 2,
    wherein the driver integrally drives the front lens group and the reflection member.

4. The optical unit of claim 3,
    wherein the driver rotates the front lens group and the reflection member in the pitch direction around a rotation axis positioned at a periphery of an intersection point of a reflection surface of the reflection member and an optical axis of the front lens group or the rear lens group, and
    a rotation amount of the front lens group in the pitch direction is equal to or larger than a rotation amount of the reflection member in the pitch direction.

5. The lens unit of claim 3,
    wherein the driver rotates the front lens group and the reflection member in the yaw direction around a rotation axis which is positioned at a periphery of an intersection point of a reflection surface of the reflection member and an optical axis of the front lens group or the rear lens group, and
    a rotation amount of the front lens group in the yaw direction is equal to a rotation amount of the reflection member in the yaw direction.

6. The optical unit of claim 1,
    wherein the driver comprises a piezoelectric element.

7. The optical unit of claim 1,
    wherein the optical unit comprises a variable magnification optical system.

8. The optical unit of claim 1,
    wherein the front lens group is a lens group closest to the object side of the optical unit.

9. The optical unit of claim 1,
    wherein the front lens group comprises a plurality of lens groups.

10. An image pickup apparatus comprising an optical unit for forming an object image, comprising:
- a reflection member for bending an optical axis of the optical unit;
- a front lens group arranged closer to an object side of the optical unit than the reflection member;
- a rear lens group arranged closer to an image forming side of the optical unit than the reflection member; and
- a driver for driving the optical unit,
- wherein the driver drives the reflection member and the front lens group
- in a first direction changing an angle formed between an optical axis of the front lens group and an optical axis of the rear lens group and
- in a second direction not changing the angle formed between the optical axis of the front lens group and the optical axis of the rear lens group.

11. The image pickup apparatus of claim 10, further comprising:
- an image pickup element for converting an object image formed by the optical unit into electrical signal.

12. The image pickup apparatus of claim 10,
- wherein the first direction is a pitch direction, and
- the second direction is a yaw direction.

13. The image pickup apparatus of claim 12,
- wherein the driver integrally drives the front lens group and the reflection member.

14. The image pickup apparatus of claim 13,
- wherein the driver rotates the front lens group and the reflection member in the pitch direction around a rotation axis positioned at a periphery of an intersection point of a reflection surface of the reflection member and an optical axis of the front lens group or the rear lens group, and
- a rotation amount of the front lens group in the pitch direction is equal to or larger than a rotation amount of the reflection member in the pitch direction.

15. The image pickup apparatus of claim 13,
- wherein the driver rotates the front lens group and the reflection member in the yaw direction around a rotation axis which is positioned at a periphery of an intersection point of a reflection surface of the reflection member and an optical axis of the front lens group or the rear lens group, and
- a rotation amount of the front lens group in the yaw direction is equal to a rotation amount of the reflection member in the yaw direction.

16. The image pickup apparatus of claim 10,
- wherein the driver comprises a piezoelectric element.

17. The image pickup apparatus of claim 10,
- wherein the optical unit comprises a variable magnification optical system.

18. The image pickup apparatus of claim 10,
- wherein the front lens group is a lens group closest to the object side of the optical unit.

19. The image pickup apparatus of claim 10,
- wherein the front lens group comprises a plurality of lens groups.

* * * * *